INVENTOR.
ROBERT G. ALBRECHT
BY
Lothrop & West
ATTORNEYS

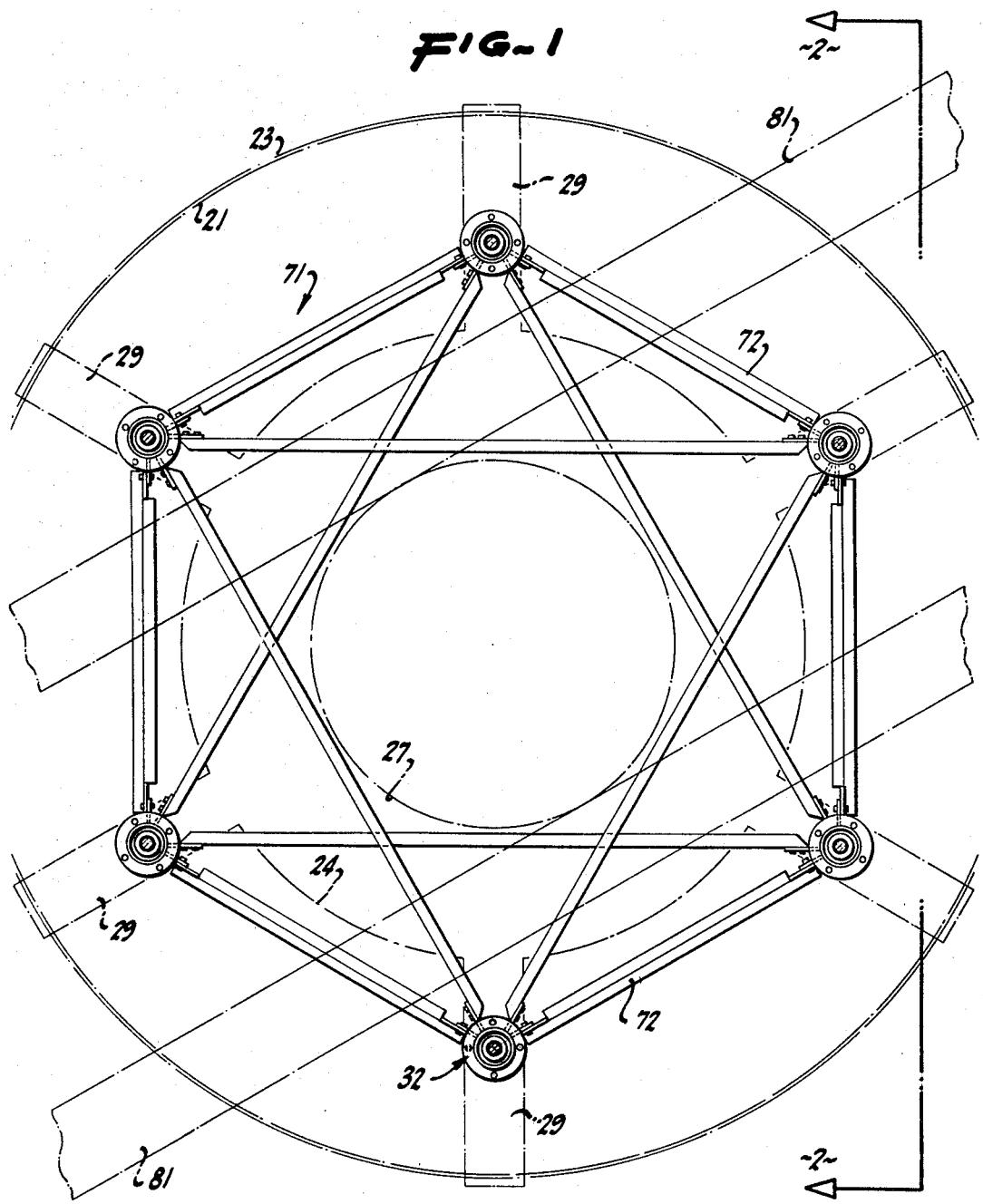

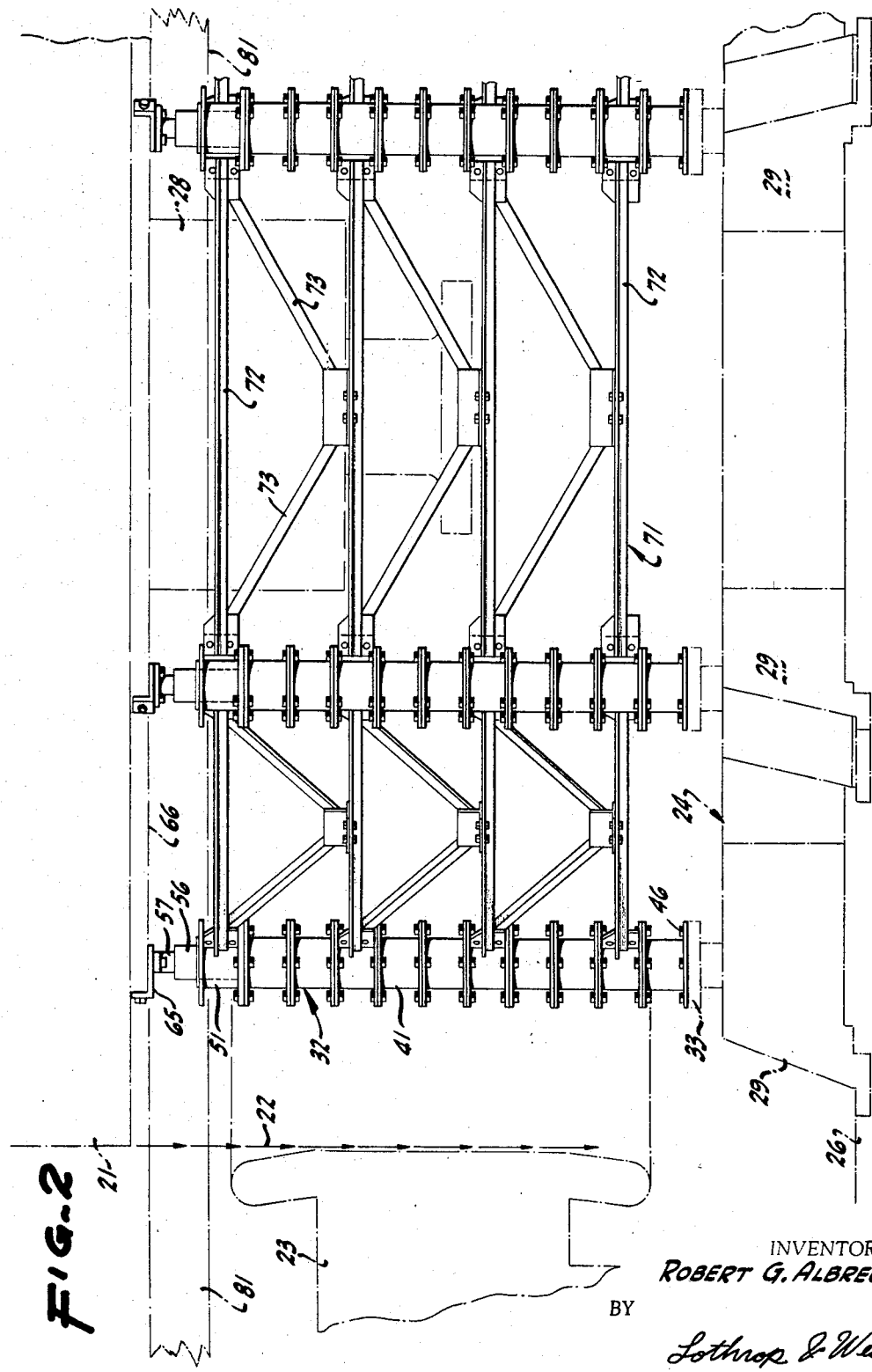

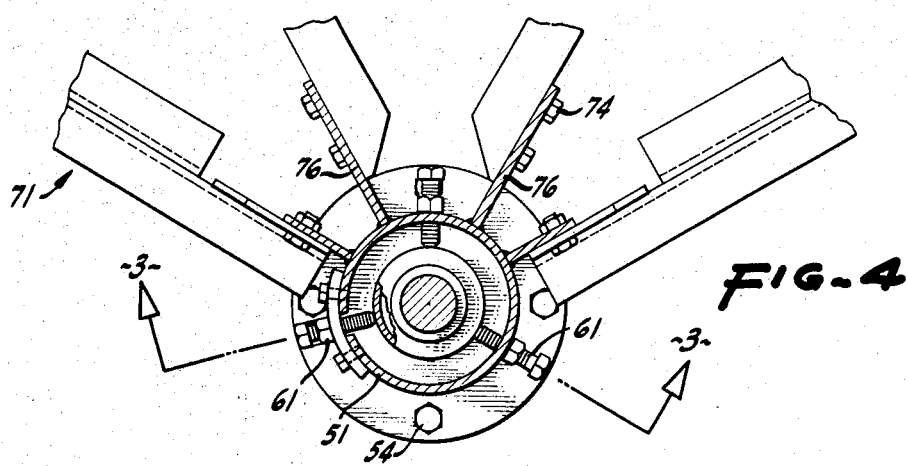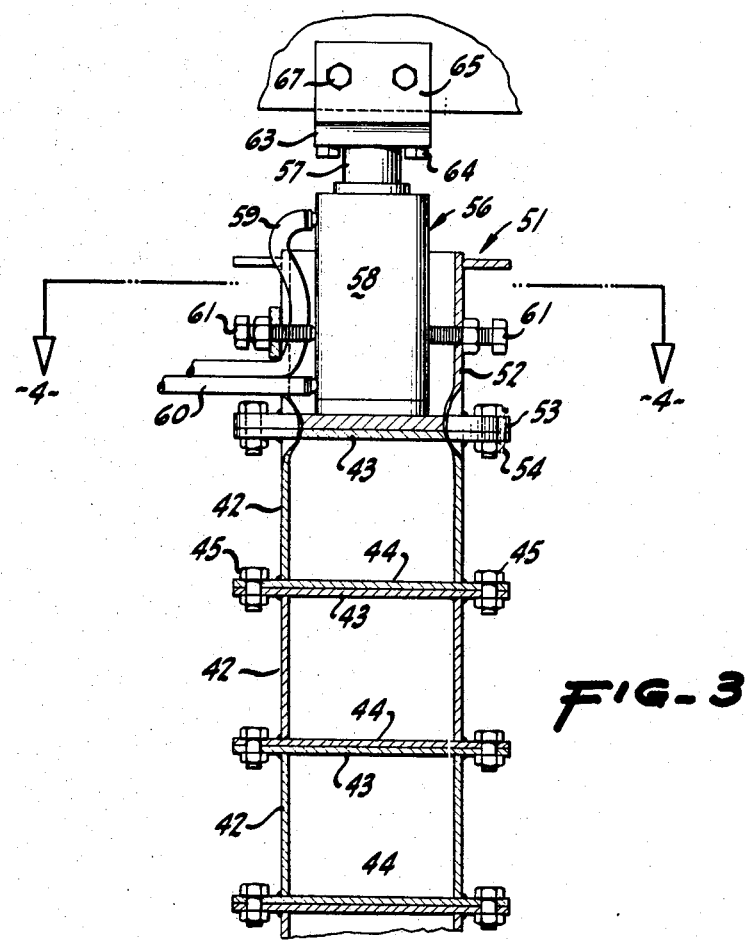

July 30, 1968  R. G. ALBRECHT  3,394,452
ROTOR HANDLING DEVICE AND METHOD OF INSTALLING ROTORS
Filed July 22, 1966  6 Sheets-Sheet 6

INVENTOR.
ROBERT G. ALBRECHT
BY
Lothrop & West
ATTORNEYS

United States Patent Office 3,394,452
Patented July 30, 1968

3,394,452
ROTOR HANDLING DEVICE AND METHOD
OF INSTALLING ROTORS
Robert G. Albrecht, Fair Oaks, Calif., assignor to Wismer
& Becker Contracting Engineers
Filed July 22, 1966, Ser. No. 567,112
5 Claims. (Cl. 29—596)

The invention relates to a device for and a method of lowering the rotor into the stator of a large electrical generator of the variety ordinarily used in power houses.

Present day generators of the kind utilized, for example, in hydro-electric installations, are massive in size and weight. Customarily, the stators are first located on suitable foundations with their axes arranged in accurate vertical attitude. It then becomes necessary to lower the rotors into the stators and onto the appropriate rotor supports.

The spacing between the rotor and the stator is small, despite the large size of the rotor. Consequently, an extraordinarily nice degree of control over the downward movement and final placement of the rotor must be exercised.

Yet, in the interests of saving costs and avoiding tying up a large crane for extended periods, it is highly desirable to effect the installation of a rotor in a relatively short time, with relatively few men and without the necessity of using a large crane throughout the entire operation.

It is therefore an object of the invention to provide a rotor handling method and device which is capable of installing a rotor with great accuracy.

It is another object of the invention to provide a rotor handling device and method which is relatively inexpensive, yet which is expeditious in use and does not require the use of a large crane for a protracted period of time.

It is a further object of the invention to provide a rotor handling structure which is flexible in use and can be adapted to the many and varying conditions and limitations encountered in most power house installations.

It is an additional object of the invention to provide a generally improved rotor handling device and method of installing rotors.

Other objects, together with the foregoing, are attained in the following described method and in the embodiments described in the following description and illustrated in the accompanying drawings in which:

FIGURE 1 is a fragmentary top plan view of a rotor handling device pursuant to the invention, with portions of certain temporary auxiliary members, the permanent rotor supporting structure and the rotor and stator being shown in outline;

FIGURE 2 is a fragmentary side elevational view of FIGURE 1, the plane of the view being indicated by the line 2—2 in FIGURE 1;

FIGURE 3 is a fragmentary sectional view, to an enlarged scale, of the upper portion of a typical segmented column and attendant hydraulic cylinder and ram structure, the compound plane of the section being indicated by the line 3—3 in FIGURE 4;

FIGURE 4 is a fragmentary, horizontal sectional view, to an enlarged scale, the plane of the section being indicated by the line 4—4 in FIGURE 3;

Figure 5:
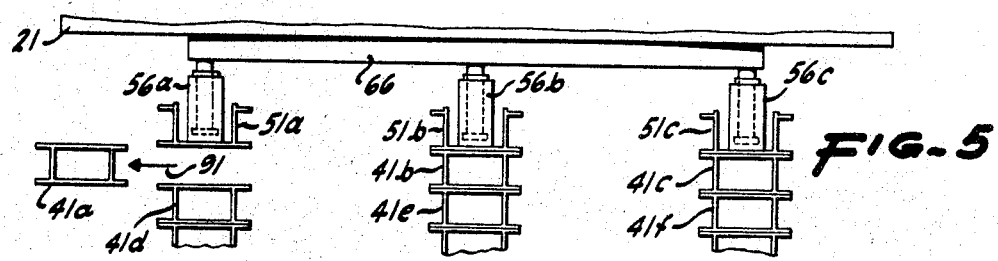
FIGURES 5 through 9 illustrate, in stylized form, the structure shown in FIGURE 2, and depict the sequence followed in lowering the rotor through one tier of the columnar segments.

While the rotor handling device and method of the invention are susceptible of numerous physical embodiments and variations in procedures, substantial numbers of rotors have been installed with eminently successful results by using the herein shown and described structures and processes.

As appears most clearly in FIGURES 1 and 2, the task to be performed entails the accurate lowering of a rotor 21 vertically downwardly in the direction indicated by the arrows 22 into a stator 23 previously located on a suitable stator foundation (not shown).

At the conclusion of the operation the rotor 21 is to be supported for rotation on the customary weight bearing elements (not shown) mounted on a lower bracket 24, or rotor support, secured in a foundation 26.

The rotor support 24 is conventional in construction and in general comprises an annular structure 27 having a central opening encompassing the depending rotor shaft 28 in installed position of the rotor.

The rotor support 24 includes a plurality of radial arms (six in number in FIGURES 1 and 2) designated by the reference numeral 29; and these arms also afford a support for the rotor handling device of the present invention as will now be described.

Mounted on each of the lower bracket arms 29 is a segmented column, generally designated by the numeral 32, each of the columns being detachably secured at its lower end to a footing 33 disposed on the top surface of the subjacent rotor supporting arm 29.

Each of the columns is substantially identical and a description of one will therefore serve to describe all of them.

Each column comprises a plurality of tiered, or stacked, spool-shaped segments 41, each segment including a vertical pipe portion 42 (see FIGURE 3) having mounted thereon an upper horizontal flange 43 and a lower horizontal flange 44. The flanges are formed with suitable registering apertures for the reception of detachable fasteners 45.

As previously stated, the bottom-most segment of each column is secured to the flanged footing 33, suitable fasteners 46 (see FIGURE 2) being provided for this purpose.

On the upper-most segment 41 of each column there is afforded a receptacle 51 comprising an open ended vertical pipe portion 52 and a sturdy bottom flange 53 welded 53 welded thereto, the flange 53 being detachably connected to the immediate subjacent segment 41 by suitable fasteners 54.

The receptacle 51 is especially constructed to receive a jack member 56, or ram, including a vertically movable plunger 57 actuated by a driver element 58, such as a hydraulic cylinder with conventional fluid conduits 59 and 60 connected to an appropriate fluid pressure source, a fluid reservoir and attendant control valves (not shown).

Accurate stationing of the cylinder within the receptacle is afforded by a plurality of adjustable placement screws 61, the screws bearing with sufficient force against the cylinder 58 so that the receptacle 51 moves in unison with the jack 56 for a purpose later to be described.

Secured to the flanged upper end 63 of the plunger 57 by fasteners 64 is an angle plate 65, the angle plate being, in turn, detachably mounted on the bottom projection 66 of the rotor 21 by fasteners 67.

As appears most clearly in FIGURES 1, 2 and 4, the columns are braced or tied together to form a strong and rigid structure by a framework, generally designated by the reference numeral 71, the framework comprising a plurality of appropriate horizontal structural shapes 72 and struts 73 appropriately secured thereto to provide a plurality of stiffening trusses.

The structural framework elements, as is shown most clearly in FIGURE 4, are detachably secured by fastenings 74 to vertical radial plates 76, or gussets, outstanding from and welded to predetermined ones of the segments 41 as well as to all of the jack receptacles 51 as can be seen in exemplary fashion in FIGURE 2.

The rotor is erected on top of the instant device for completion. In this, as well as in most other cases, shoring is located on top of the framework 71 as is shown in FIGURES 1 and 2, in order temporarily to support the rotor.

Figure 11:
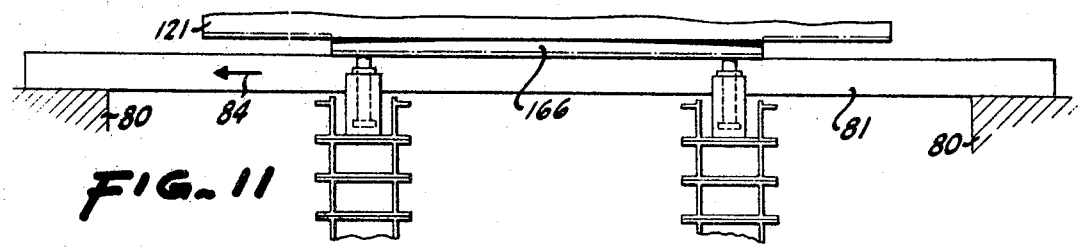
Figure 12:
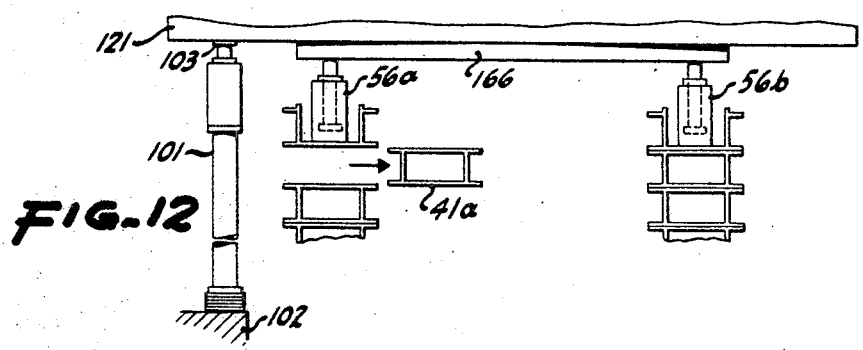

Conveniently, the shoring comprises at least a pair of large steel beams 81 extending across and above the top of the framework and projecting outwardly therefrom a distance such as to span supports 80 (see FIGURE 11).

After placement of the heavy beams 81 and after lowering of the rams so that the angle plates 65 are below the projection 66 of the rotor 21, the rotor is lowered onto the beams and jockeyed into a central position so that the rotor axis is substantially coincident with the stator axis.

Thereafter, the ram angle plates 65 are attached to the rotor bottom portion 66, as is shown in FIGURE 2, the rams conveniently being slightly extended upwardly so as to position the plates 65 vertically for ready attachment to the rotor portion 66.

At this juncture, the operation can be commenced.

First, all of the rams are extended upwardly a slight amount so that the rotor is slightly lifted and no longer rests on the temporary beams. The beams 81 are thereupon withdrawn laterally in the direction of the arrow 84 (see FIGURE 11).

After removal of the beams, the position of the elements is substantially as indicated in FIGURE 2, the entire weight of the rotor being at this time supported on the rams and, in turn, on the columns.

Reference is now had to the "motion picture" sequence shown in FIGURES 5 through 9 to illustrate the manner in which the rotor is typically lowered through one entire tier of segments.

For convenience, the entire jacking mechanism 56 is interchangeably termed a jack, or a ram, and when it is said that the jack, or ram, is extended, or lengthened, it is meant that the plunger 57 is projected relative to the cylinder 58. Conversely, when it is said that the jack, or ram, is retracted, or shortened, it is meant that the plunger is withdrawn, at least partially, with respect to the cylinder.

With the components positioned as shown in FIGURE 2, the lowering of the rotor 21 through the uppermost tier is effected (see FIGURE 5) by first disconnecting the ram receptacle 51a from the subsequent segment 41a, followed by slightly shortening the ram length. Since the top of the ram 56a is secured to the bottom portion 66 of the rotor 21, the effect of shortening the ram is to lift the ram receptacle 51a off the subsequent segment 41a.

Then, by disconnecting the segment 41a from the next subjacent segment 41d, the segment 41a can be removed, as in the direction of the arrow 91 in FIGURE 5.

While the removal of the segment 41a is taking place, the weight of the rotor is borne by the other five columns, the spacing and strength of the five columns being quite sufficient to support the rotor in the desired manner.

Figure 6:
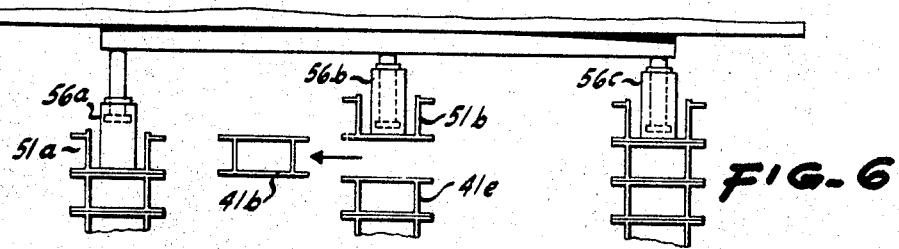
Figure 7:
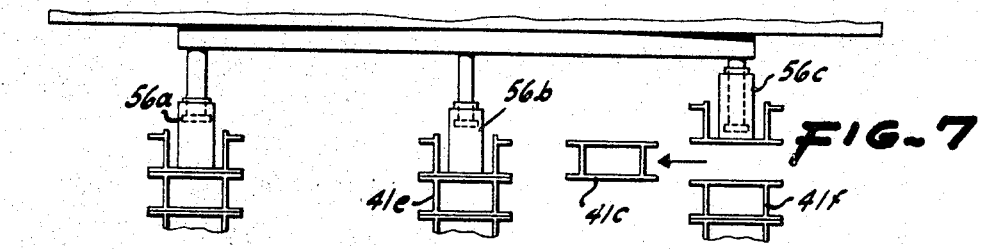

After removal of the segment 41a, the ram 56a is extended, or lengthened, in the manner indicated in FIGURE 6 so that the ram 56a and the receptacle 51a are lowered into weight-transferring relation with respect to the next subjacent segment 41d, the receptacle 51a and the segment 41d being thereupon secured together by suitable fasteners.

Where, as in the FIGURE 1 through 9 arrangement, six supporting columns are used, the foregoing procedure can be simultaneously carried out with two diametrically opposed segments since the rotor weight is evenly balanced on the four remaining columns. In this fashion, the time required to lower the rotor through a tier is substantially reduced.

With the ram 56a in the extended position shown in FIGURE 6, the subjacent column resumes its share of the burden.

At this juncture, the ram 56b is shortened, thus lifting the receptacle 51b and allowing withdrawal of the segment 41b. The ram 56b is then extended into weight supporting engagement with the next subjacent segment 41e, as it appears in FIGURE 7.

This is followed by removal of the segment 41c and extending the ram 56c until it abuts the segment 41f.

Figure 8:
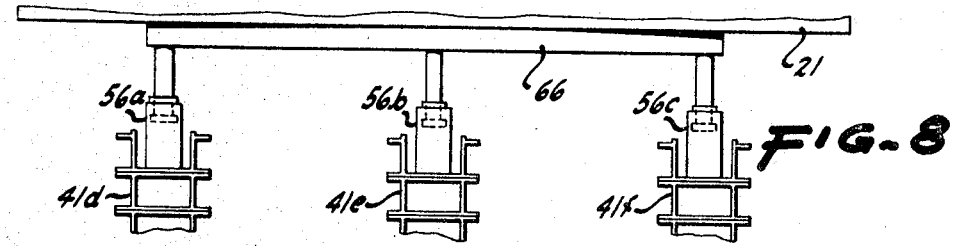
Figure 9:
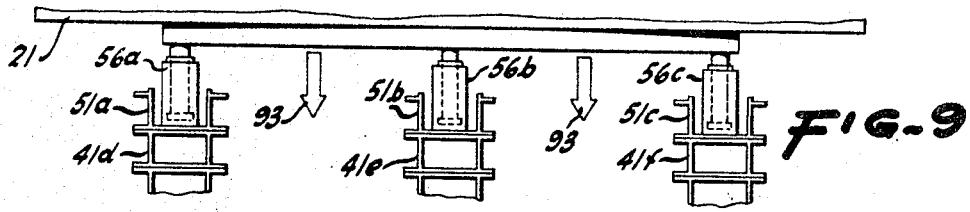
Figure 10:
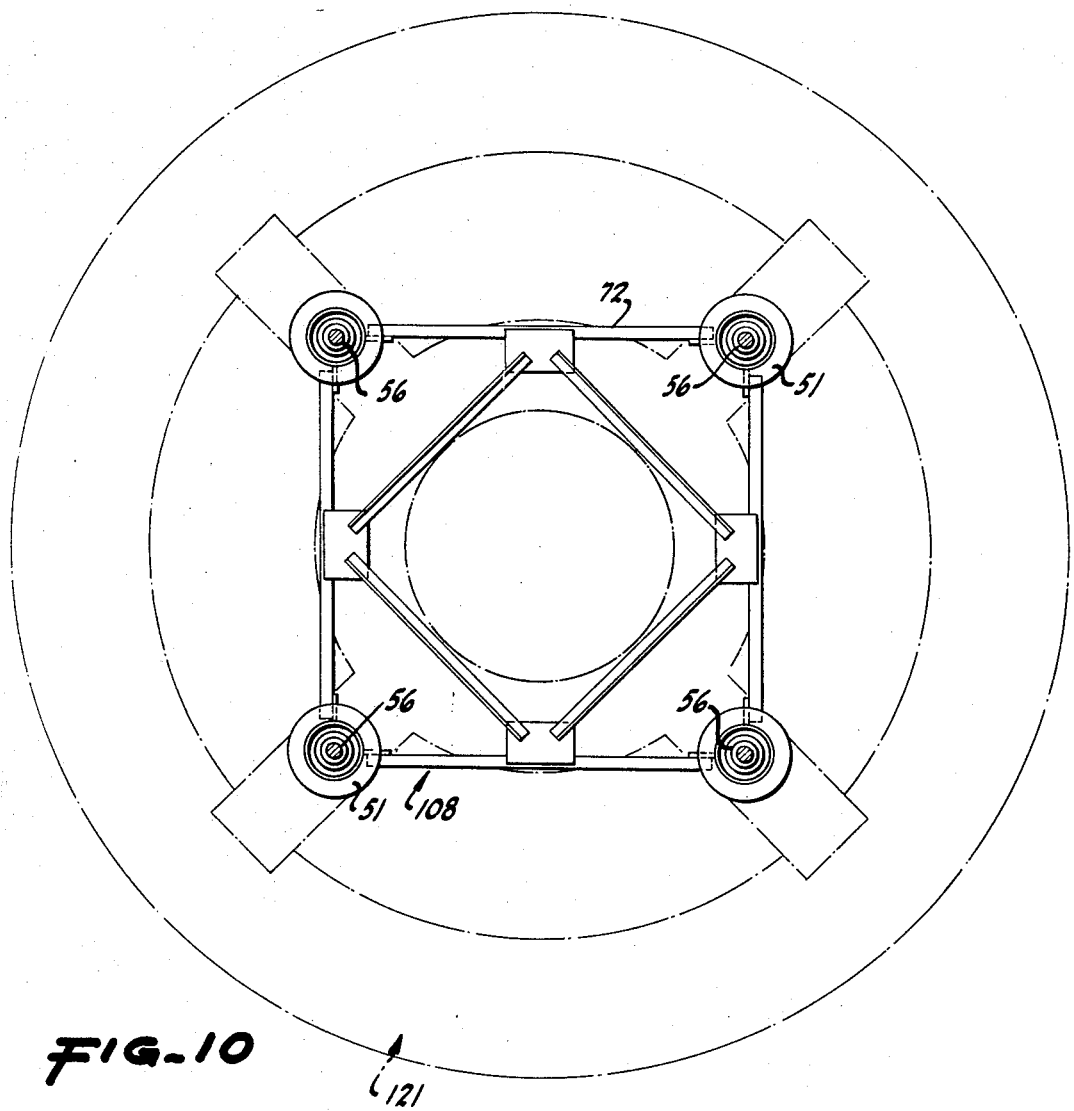
FIGURE 10 is a top plan view comparable to that of FIGURE 1 but illustrating a varietal form of the device wherein the rotor is supported on four members rather than on six members as in FIGURE 1; and, FIGURES 11 through 14 are comparable in presentation to that shown in FIGURES 5 through 9, but illustrating the sequence in lowering a rotor using the FIGURE 10 form of the device.

As appears most clearly in FIGURES 8 and 9, when all of the segments in the same tier have been removed in the manner explained, all of the jacks are concurrently shortened, thus lowering the rotor in the direction indicated by the arrows 93 in FIGURE 9.

As the rotor reaches the lowered location shown in FIGURE 9, the foregoing steps are repeated until the second tier segments are removed, at which time the rotor is again lowered.

This process of removing the segments and lowering the rotor tier by tier is accompanied by the removal of the bracing framework at the appropriate junctures.

This incremental lowering of the rotor is continued, in the manner described, until the rotor is landed on its supporting structure. In this process the jacks and jack receptacles are removed in a manner comparable to that described for the removal of column segments. In lieu of the jacks, the conventional generator brake cylinders (not shown) are inserted so that at the completion of the operation the rotor is supported on six generator brake cylinders.

At a later juncture the rotor weight is transferred to rotor thrust bearings and the generator brakes are relieved of their weight bearing function. These operations, however, are conventional and form no part of the present invention.

In the case of rotors 121 which have four supporting members, as in FIGURES 10 through 14, the general procedure is quite similar to that previously described.

However, since the removal of a segment from one of the four supporting columns creates a risk of tipping the rotor, an auxiliary, temporary support is provided adjacent the column being shortened. Preferably, this support assumes the form of an elongated, segmented jacking tower 101 (see FIGURE 12).

The tower 101 is located on any convenient footing 102 and is initially extended until its top plate 103 is in rotor supporting position, adjacent the column being shortened. Then, as before, the adjacent jack 56a is disconnected from the subjacent segment and retracted to allow withdrawal of the subjacent column segment.

Figure 13:
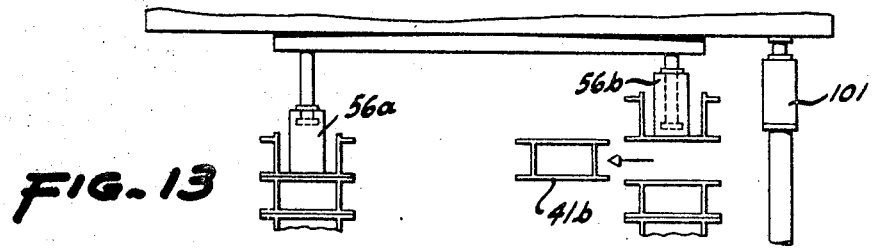

This step is followed by extending the jack, as in FIGURE 13 until the weight is again imposed on the subjacent column, at which juncture the jacking tower 101 can be removed and relocated to a position adjacent the next column. The ram 56b is then shortened, the subjacent segment is removed, as in FIGURE 13, and the ram 56b is extended as in FIGURE 14.

Figure 14:
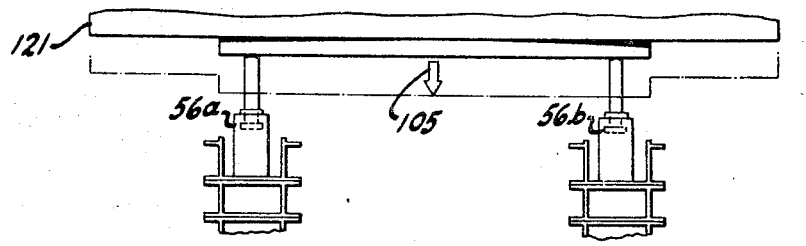

Having removed all segments from the tier, the rams are concurrently shortened, thus allowing downward movement of the rotor in the direction of the arrow 105, the extent of movement being shown by the increment indicated in outline in FIGURE 14, this increment corresponding to the height of the tier previously removed.

As before, the four columns are braced and tied together by an appropriate detachable framework 108 (see FIGURE 10), the several framework portions being removed in turn as the rotor is lowered incrementally through the tiers.

As the rotor nears the bottom, the rams and ram receptacles are removed, as previously explained, and the rotor 121 is brought to rest on the usual generator brakes (not shown), the brakes being, in this instance, four in number. At a later time the rotor weight is shifted in conventional manner to the rotor thrust bearings.

It can therefore be seen that I have provided a device and a method for installing rotors which is flexible in that the apparatus and the process can readily be adapted to a variety of circumstances and conditions encountered in the field. Furthermore, the safety and relative ease with which a rotor can be lowered without the use of a crane provides numerous cost and scheduling advantages over the devices and procedures heretofore used in generator installations.

What is claimed is:

1. A device for lowering a rotor vertically into the stator of a large electrical power generator mounted on a horizontal foundation including a stator supporting portion and a rotor supporting portion, said device comprising:
   (a) a plurality of segmented columns mounted vertically on the rotor supporting portion and spaced equally around said rotor supporting portion to provide equal support to a rotor superimposed on said columns, each of said columns including an equal number of substantially identical detachable segments in vertically stacked arrangement;
   (b) a detachable bracing framework interconnecting said columns; and,
   (c) a plurality of jacks surmounting said columns supporting said rotor, each of said jacks including a vertical plunger portion movable a distance at least as great as the vertical dimension of each of said segments for transferring the rotor weight borne by each of said jacks to the subjacent one of said segments as a subjacent one of said segments is removed and the corresponding one of said jacks is thereafter extended to span the distance between said rotor and said column.

2. A rotor handling device as in claim 1 further characterized by an extensible jacking tower removably supported on the generator foundation and being capable of temporarily supporting said rotor at a location adjacent a predetermined one of said jacks as one of said segments is removed from the corresponding one of said columns.

3. A rotor handling device as in claim 1 wherein each of said segments includes a vertical pipe and an upper and a lower flange mounted thereon, said flanges being apertured to receive fastenings.

4. A rotor handling device as in claim 3 further characterized by a plurality of jack receptacles detachably secured to the uppermost segment of each of said columns, each of said receptacles including means for centering one of said jacks positioned therein, and wherein each of said plungers includes a bracket detachably secured to said rotor.

5. A method of installing a generator rotor vertically into a generator stator and onto a rotor supporting member, said method comprising the steps of:
   (a) erecting on said member a plurality of tiered segmented columns each surmounted by a detachable rotor supporting ram;
   (b) partially extending said rams;
   (c) lowering the rotor onto said rams in coaxial relation with respect to the vertical axis of the stator;
   (d) securing the tops of said rams to said rotor;
   (e) disconnecting at least one of said rams from the subjacent column segment;
   (f) retracting said disconnected ram to separate said ram from said subjacent column segment;
   (g) removing said subjacent column segment;
   (h) extending said ram into weight supporting abutment with the next subjacent column segment;
   (i) repeating the foregoing steps with the others of said rams and said column segments in the same tier;
   (j) retracting all of said rams in said same tier; and,
   (k) repeating the foregoing steps until said rotor is lowered onto said rotor supporting member.

References Cited
UNITED STATES PATENTS 3,053,015  9/1962  Graham _____ 254—89 X
3,221,838  12/1965  Brayton _____ 254—105 X JOHN F. CAMPBELL, *Primary Examiner.*

C. E. HALL, *Assistant Examiner.*